(12) United States Patent
Cahill et al.

(10) Patent No.: US 9,039,102 B2
(45) Date of Patent: May 26, 2015

(54) SYSTEMS AND METHODS FOR EMERGENCY BRAKING SYSTEM

(75) Inventors: Eric D. Cahill, Troy, OH (US); Paul R. Burte, Clayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 219 days.

(21) Appl. No.: 13/228,328

(22) Filed: Sep. 8, 2011

(65) Prior Publication Data

US 2013/0062935 A1     Mar. 14, 2013

(51) Int. Cl.
| | |
|---|---|
| *B60T 13/00* | (2006.01) |
| *B60T 7/04* | (2006.01) |
| *B60T 7/12* | (2006.01) |
| *B60T 8/17* | (2006.01) |
| *B64C 25/42* | (2006.01) |
| *B60T 8/00* | (2006.01) |
| *B60T 8/96* | (2006.01) |

(52) U.S. Cl.
CPC . *B60T 7/042* (2013.01); *B60T 7/12* (2013.01); *B60T 8/1703* (2013.01); *B64C 25/426* (2013.01); *B60T 8/00* (2013.01); *B60T 8/96* (2013.01)

(58) Field of Classification Search
USPC .......... 303/20, 113.4, 126, 155, 199; 701/70, 701/78, 29.7, 30.3, 30.5, 30.6, 30.7
See application file for complete search history.

(56) References Cited

U.S. PATENT DOCUMENTS

| | | | | |
|---|---|---|---|---|
| 3,503,654 A | * | 3/1970 | Stamm ........................... | 303/156 |
| 3,558,197 A | * | 1/1971 | Lueck et al. ................... | 303/156 |
| 3,807,810 A | * | 4/1974 | Yarber ............................ | 303/20 |
| 3,820,857 A | * | 6/1974 | Schnaibel et al. ............. | 303/185 |
| 3,891,932 A | * | 6/1975 | Conner et al. .................. | 327/69 |
| 3,893,537 A | * | 7/1975 | Sakakibara .................... | 180/176 |
| 3,917,356 A | * | 11/1975 | DeVlieg ........................ | 303/126 |
| 3,926,479 A | * | 12/1975 | Bissell et al. ............. | 303/122.04 |
| 3,985,210 A | * | 10/1976 | Hodge et al. .................. | 188/170 |
| 3,997,889 A | * | 12/1976 | Sato et al. ..................... | 340/652 |
| 4,043,607 A | * | 8/1977 | Signorelli et al. ............. | 303/112 |
| 4,196,377 A | * | 4/1980 | Boxer ........................... | 318/269 |
| 4,293,165 A | * | 10/1981 | Hirzel ........................... | 303/155 |
| 4,565,067 A | * | 1/1986 | Tani et al. ...................... | 60/545 |
| 4,572,585 A | * | 2/1986 | Guichard ......................... | 303/3 |
| 4,760,491 A | * | 7/1988 | Hurley ......................... | 361/210 |
| 4,834,465 A | * | 5/1989 | Guichard et al. .............. | 303/15 |

(Continued)

FOREIGN PATENT DOCUMENTS

WO      0105655      1/2001

OTHER PUBLICATIONS

Search Report dated Aug. 30, 2013 in European Application No. 12169653.8.

*Primary Examiner* — Robert A Siconolfi
*Assistant Examiner* — James Hsiao
(74) *Attorney, Agent, or Firm* — Snell & Wilmer L.L.P.

(57) ABSTRACT

Systems and methods disclosed herein may be useful emergency braking systems for use in, for example, an aircraft. A system is disclosed that allows emergency braking without the need for a manually operated emergency brake. For example, a system is provided comprising a potentiometer in mechanical communication with a brake pedal, a first electronic switch in electrical communication with the potentiometer, a second electronic switch indicating a displacement of the brake pedal, wherein a brake control valve opens in response to the first electronic switch, and wherein a shutoff valve opens in response to the second electronic switch.

20 Claims, 3 Drawing Sheets

(56) References Cited

U.S. PATENT DOCUMENTS

| | | | |
|---|---|---|---|
| 5,125,483 A * | 6/1992 | Kitagawa et al. | 188/158 |
| 5,397,173 A * | 3/1995 | Bourguet | 303/2 |
| 5,417,477 A * | 5/1995 | Lasbleis | 303/3 |
| 5,456,523 A | 10/1995 | Boehringer | |
| 6,183,051 B1 * | 2/2001 | Hill et al. | 303/126 |
| 6,296,325 B1 | 10/2001 | Corio et al. | |
| 6,513,885 B1 * | 2/2003 | Salamat et al. | 303/122.09 |
| 6,527,348 B2 * | 3/2003 | Jensen | 303/9.63 |
| 6,626,271 B1 * | 9/2003 | Bohm et al. | 188/158 |
| 6,820,946 B2 * | 11/2004 | Salamat et al. | 303/122.09 |
| 6,902,241 B2 * | 6/2005 | Yamamoto et al. | 303/122 |
| 7,128,376 B2 * | 10/2006 | Williams et al. | 303/15 |
| 7,213,891 B2 * | 5/2007 | Sibre | 303/20 |
| 7,353,101 B2 * | 4/2008 | Phillips | 701/70 |
| 7,437,231 B2 * | 10/2008 | Kolberg | 701/70 |
| 7,618,100 B2 * | 11/2009 | Griffith et al. | 303/20 |
| 8,152,247 B2 * | 4/2012 | Colin | 303/199 |
| 2005/0012385 A1 * | 1/2005 | Sibre | 303/20 |
| 2005/0173980 A1 * | 8/2005 | Bohm et al. | 303/155 |
| 2006/0108864 A1 * | 5/2006 | Evans et al. | 303/126 |

* cited by examiner

SYSTEMS AND METHODS FOR EMERGENCY BRAKING SYSTEM

FIELD

The present disclosure is related to systems and methods for emergency braking systems for use in, for example, an aircraft.

BACKGROUND

Aircraft often include an emergency braking system that enables brake actuation in the event the primary braking systems fail. For example, such systems may include a handbrake that a pilot would operate manually in the event the primary braking system fails. However, such systems often require the use of a handbrake component, which enhances weight, uses valuable cockpit space, and typically includes a cable that must be run from the cockpit to the braking system. Emergency braking systems (that include a handbrake that connect to other components via a cable) also present assembly difficulties in aircraft construction. Thus, there is a need for emergency braking systems that do not require a hand brake.

SUMMARY

Systems and methods disclosed herein may be useful for use in emergency braking systems. In this regard, a system is provided comprising a potentiometer in mechanical communication with a brake pedal, a first electronic switch in electrical communication with the potentiometer, and a second electronic switch indicating a displacement of the brake pedal, wherein a brake control valve opens in response to the first electronic switch, and wherein a shutoff valve opens in response to the second electronic switch.

In various embodiments, a method is provided comprising receiving, at a potentiometer, a voltage in accordance with displacement of a brake pedal, opening a first electronic switch in response to an OR gate, opening a second electronic switch in response to displacement of the brake pedal, receiving, at a brake control valve, a control signal through the first electronic switch, and receiving, at a shutoff valve, a control signal through the second electronic switch.

In various embodiments, a system is provided comprising a potentiometer in electrical communication with a brake pedal, a first electronic switch in electrical communication with the potentiometer, and a second electronic switch indicating a displacement of the brake pedal, wherein an electronic brake control actuator receives a braking command opens in response to the first electronic switch, and wherein the electronic brake control actuator commands braking in response to the second electronic switch.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
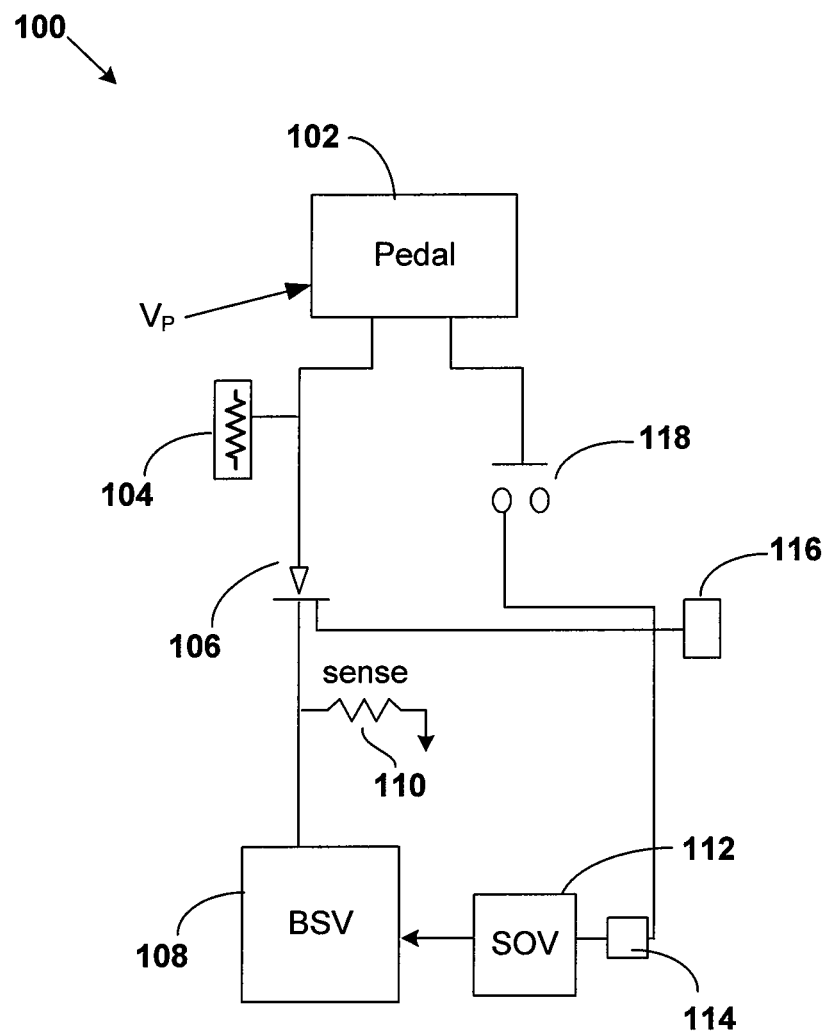
FIG. 1 illustrates an emergency braking system in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for emergency braking systems. Although the embodiments herein are described with reference to emergency braking systems used in connection with aircraft, such embodiments are provided for example only as it is contemplated that the disclosures herein have applicability to other vehicles, such as for example, automobiles.

Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may have front and rear axial ends and alternating rotor and stator disks mounted with respect to the wheel support and wheel for relative axial movement. Each rotor disk may be coupled to the wheel for rotation therewith and each stator disk is coupled to the wheel support against rotation. A back plate may be located at the rear end of the disk pack and a brake head may be located at the front end. The brake head may house one or more actuator rams that extend to compress the brake disk stack against the back plate. Torque is taken out by the stator disks through a static torque tube or the like.

The actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position (e.g., an armed position), fluid pressure is permitted to pass through the valve, while in a second position (e.g., a disarmed position) fluid pressure is prevented from passing through the valve. During normal braking, the SOV is in the armed position, thereby permitting the flow of fluid pressure. The BSV, based on braking commands from the pilot (often via an electronic controller that may implement, for example, anti-skid logic), controls the amount of fluid pressure provided to the actuator ram, and thus, the braking force applied to the wheel. To prevent unintentional braking (e.g., due to a faulty servo valve) at various times, the SOV is set in the disarmed position, thereby removing fluid pressure from the BSV. Since the BSV does not receive fluid pressure, it cannot provide fluid pressure to the actuator ram, and thus, braking cannot be effected.

In electronic brakes, a brake controller is coupled to one or more electromechanical actuator controllers ("EMAC") for a brake, which drives one or more electromechanical brake actuators. The brake controller may be in communication with a brake pedal, and thus may control the EMAC in accordance with pilot/copilot braking commands.

With reference to FIG. 1, emergency braking system 100 is illustrated. Pedal 102 represents an aircraft brake pedal. Pedal 102 produces an output in accordance with the amount of deflection. Deflection of pedal 102 occurs in response to the pedal being moved from its "home" or rest position, such as when a pilot moves the pedal with his foot. A pedal may be deflected up to a maximum amount and the amount of deflection may be expressed as a percentage of maximum deflection. For example, a pedal at ten percent deflection is deflected to 10% of the maximum deflection, The output of pedal 102 may be any suitable output, for example, an electrical output (e.g., output voltage) or a mechanical output (e.g., the movement of a cable or other tangible component), combinations thereof and the like. In various embodiments, pedal 102 produces an electrical output (i.e., a voltage), a mechanical output, and/or combinations thereof. Voltage $V_p$ may be introduced into pedal 102.

The output of pedal 102 may pass to potentiometer 104. Potentiometer 104 may be any suitable potentiometer now known or later developed. Potentiometer 104 may also comprise other devices that produce a variable output voltage in accordance with an input. For example, potentiometer 104 may comprise a linear variable differential transformer (LVDT). A potentiometer may produce a variable output voltage in accordance with an input. A potentiometer input may include movement of the potentiometer's wiper or other component of the potentiometer. Stated another way, the potentiometer may produce an output voltage in accordance with movement of one or more components of the potentiometer. In like manner, potentiometer 104 may produce an output voltage in accordance with the deflection of pedal 102. For example, if pedal 102 is deflected to fifty percent of maximum deflection, potentiometer 104 may be configured to output X volts. If pedal 102 is deflected to seventy percent of maximum, potentiometer 104 may be configured to produce Y volts, where Y>X. Pedal 102 may be coupled to potentiometer 104 in any suitable manner. For example, pedal 102 may be coupled to a component of potentiometer 104 such that deflection of pedal 102 causes a change in the output voltage of potentiometer 104. In various embodiments, a minimum deflection threshold may be defined such that a low amount of deflection of pedal 102 (e.g., ten percent deflection or less) may be configured to not engage or otherwise affect potentiometer 104. In such embodiments, the voltage of potentiometer 104 would not change in response to a deflection below the minimum deflection threshold.

The output of potentiometer 104 may pass an electronic switch such as first electronic switch 106. An electronic switch may be any suitable electronic switch. For example, a silicon controlled rectifier switch ("SCR"), a Hall Effect sensor, and the like may comprise an electronic switch. An electronic switch may be toggled, meaning switched between the "on" and "off" positions, through multi-way (e.g. three way) electronic switches are contemplated herein. In various embodiments, the "on" position indicates that current will pass through the switch and the off position indicates that current will be prevented from flowing through the switch. Toggling an electronic switch changes the switch from one state to another state and, for two way switches, toggling switches the electronic switch from the state it is in to the state it is not in prior to the toggling. In various embodiments, first electronic switch 106 is an SCR switch.

First electronic switch 106 may be in electrical communication with potentiometer 104. When closed, first electronic switch 106 produces an output voltage or produces minimal output voltage. When open, first electronic switch 106 allows voltage from potentiometer 104 to pass through. Current sense 110 may be in electrical communication with first electronic switch 106. In such embodiments, current sense 110 may be able to detect the current, if any, flowing through first electronic switch 106. In various embodiments, first electronic switch 106 is not present in the same pedal assembly as potentiometer 104.

Logic gate 116 may be coupled to first electronic switch 106 to control the toggling of first electronic switch 106. For example, logic gate 116 may implement logic (e.g., Boolean logic such as AND, OR, and NOT) based upon output from other aircraft components. The output of logic gate 116 may toggle first electronic switch 106. For example, logic gate 116 may toggle first electronic switch 106 in response to a change in the state of logic gate 116. For example, logic gate 116 may evaluate to "TRUE" and toggle first electronic switch 106 to an off position. Logic gate 116 may then evaluate to "FALSE" and toggle first electronic switch 106 to an on position.

Logic gate 116 may be coupled to one or more brake controllers. In such a manner, logic gate 116 may be configured to evaluate to TRUE in response to the one or more brake controllers being functional and FALSE in response to no brake controller being functional.

First electronic switch 106 may be in electrical communication with a BSV, such as BSV 108. The BSV will allow hydraulic pressure to be exerted upon an actuator ram. BSV 108 may comprise various components use to control operation of BSV 108. For example, BSV 108 may comprise one or more solenoid valves. The operation of the solenoid valves thus drives operation of BSV 108. In this manner, voltage may be output from first electronic switch 106 to one or more solenoid valves of BSV 108 to operate BSV 108. As described above, pressurized hydraulic fluid may be fed to BSV 108 via a hydraulic fluid line. A BSV may be in fluid communication with SOV 112. The fluid communication may be accomplished via hydraulic fluid or via air in a hydraulic fluid line.

SOV 112 controls the output of pressurized hydraulic fluid to BSV 108. When SOV 112 is in the open state, pressurized hydraulic fluid may come into contact with BSV 108. When SOV 112 is in the closed state, hydraulic fluid may come into contact with BSV 108, but the hydraulic fluid may not be pressurized or may be under minimal pressure. Thus, when SOV 112 is closed, BSV 108 provides little or no hydraulic pressure to an actuator when BSV 108 is open. SOV 112 may comprise various components used to control operation of SOV 112. For example, SOV 112 may comprise one or more solenoid valves.

The output of pedal 102 may also pass to or through an electronic switch such as second electronic switch 118. Second electronic switch 118 may be configured to toggle in response to deflection of pedal 102. In various embodiments, second electronic switch 118 is an SCR switch and/or a Hall Effect sensor. In various embodiments, a minimum deflection threshold may be defined such that a low amount of deflection of pedal 102 (e.g., ten percent deflection or less) may be configured to not engage or otherwise affect second electronic switch 118. Second electronic switch 118 stays in the "off" position in response to pedal 102 being at zero percent deflection or below the minimum deflection threshold. In such embodiments, second electronic switch 118 would not toggle in response to a deflection below the minimum deflection threshold.

Second electronic switch 118 may be in electrical communication with SOV 112. Second electronic switch 118 may be in electrical communication with SOV 112 via logic gate 114. Logic gate 114 may comprise any suitable logic gate, for example one that implements Boolean logic such as an OR gate. In various embodiments, logic gate 114 is an OR gate that is also in communication with a standard input. A standard input represents the standard controlling functionality of the aircraft brake system as, for example, implemented by brake controllers. Thus, logic gate 114 (illustrated as an OR gate) will toggle in response to either second electronic switch 118 or a standard input. In this manner, second electronic switch 118 may toggle SOV 112. For example, when second electronic switch 118 is open, SOV 112 may be closed and when second electronic switch 118 is closed, SOV 112 may be open. In such a manner, pedal 102 may indicate pedal deflection and thus close second electronic switch 118, which in turn opens SOV 112. Pedal 102 may cease indicating pedal deflection, thus opening second electronic switch 118 and closing SOV 112.

In many aircraft having hydraulic braking, braking commands from the pilot (e.g., as indicated by pedal deflection) may be processed using braking logic. Braking logic may receive braking commands and other aircraft status information (for example, current aircraft speed or wheel speed) and produce an output to control aircraft braking. In this manner, advanced features such as anti-skid logic may be implemented. Braking logic may be implemented by a brake controller. A brake controller may be a module that implements braking logic and controls other brake system components to effect braking. In normal operation, a brake controller will operate the SOV and BSV in accordance with the braking logic and the received braking commands.

However, in the event the brake controller malfunctions or is otherwise compromised, an emergency braking system may function to receive braking commands and effect braking, even though more advanced features may be lost. Accordingly, in various embodiments and as described above, the presently disclosed systems and methods allow for emergency braking using the existing braking components (pedals, SOV, BSV), without the need for an emergency handle or a cumbersome emergency brake cable. As described above, a logic gate may be used to monitor the functioning of one or more brake controllers.

Thus, in accordance with various embodiments, a potentiometer may be driven by a brake pedal to produce an output voltage in accordance with brake pedal deflection. The output of the potentiometer may then be passed via a closed first electronic switch to a BSV enable braking. The first electronic switch may be toggled by a logic gate. To prevent a failed or malfunctioning first electronic switch, a second electronic switch may be used to be sure that brake pedal deflection is present. In the event of such a failure, second electronic switch would remain open without a pedal deflection, thus closing a SOV. In this manner, even if a BSV were to open, the closed SOV would prevent the BSV from receiving pressurized hydraulic fluid.

In various embodiments, a test mode may be run during a known "safe" time (e.g., in flight and responsive to a weight on wheels signal, or while the aircraft is on the ground and stopped, or while the brake pedal is not deflected or deflected below a minimum threshold). The test mode may consist of triggering the logic gate (for example, logic gate 116 in FIG. 1). If first electronic switch 106 is functioning, the current sense will sense the current. If current sense does not sense a current, first electronic switch 106 may be malfunctioning. In various embodiments, testing occurs within milliseconds, allowing up-to-the-minute test capability to verify system operation. Such a test may discover a dormant failure state.

Figure 2:
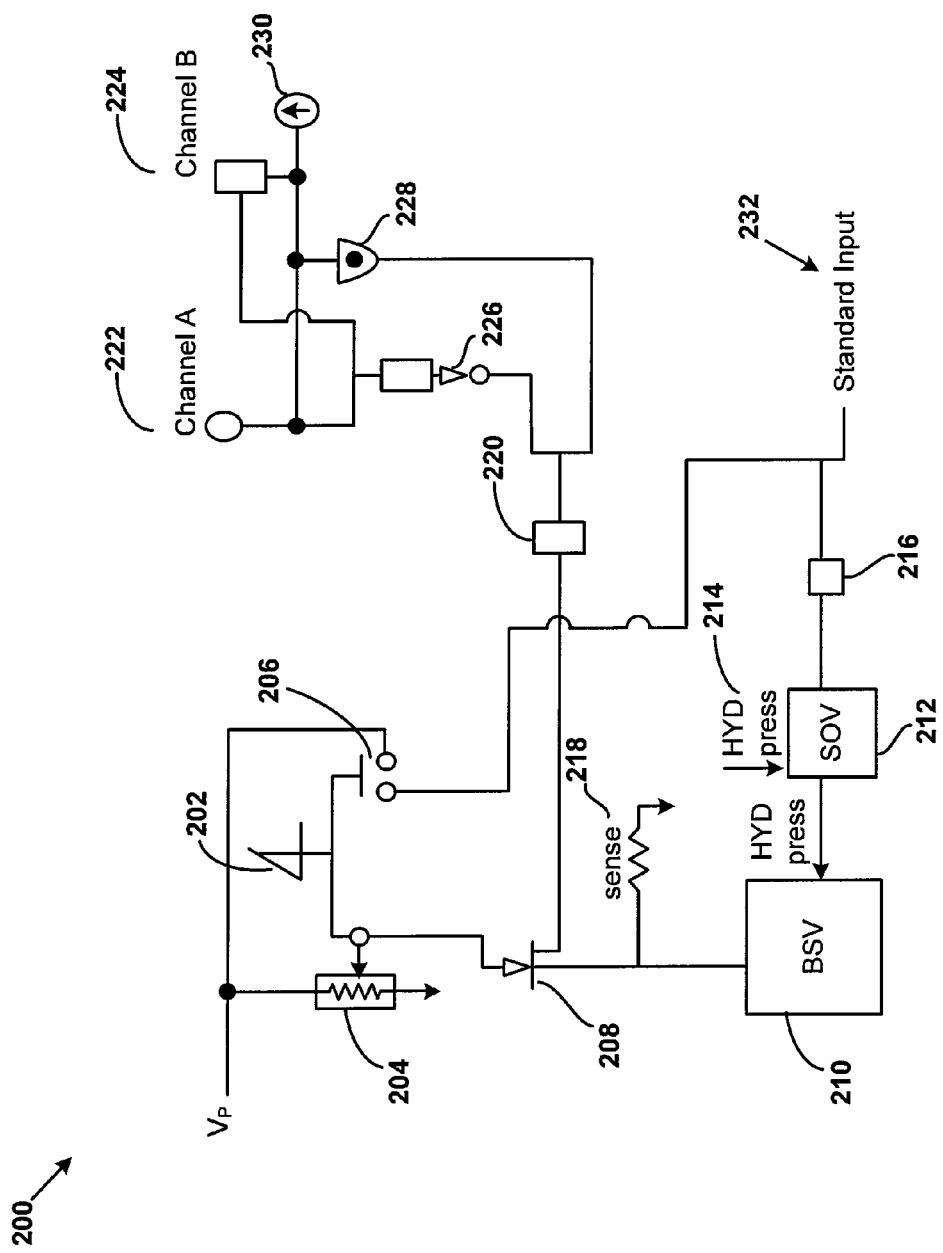
FIG. 2 illustrates a further emergency braking system for use with hydraulic brakes in accordance with various embodiments.

An exemplary emergency braking system 200 is shown in FIG. 2. Emergency braking system 200 illustrates an embodiment comprising hydraulic brakes. Voltage $V_p$ is in electrical communication with pedal 202. Pedal 202 is coupled to potentiometer 204 so that potentiometer 204 produces an output voltage in accordance with deflection of pedal 202. SCR 208 is in electrical communication with potentiometer 204. SCR 208 is controlled by OR gate 220. OR gate 220 is in electrical communication with brake controller channel A 222 and brake controller channel B 224. Brake controller channel A 222 and brake controller channel B 224 may house and implement braking logic. Brake controller channel A 222 and brake controller channel B 224 may output a status signal indicating the functioning of each respective brake controller channel. The OR gate may remain closed, and thus SCR 208 would remain open, while at least one of brake controller channel A 222 and brake controller channel B 224 are outputting a signal indicative of a functional status. Thus, both brake controller channel A 222 and brake controller channel B 224 for OR gate 220 to toggle, thus toggling SCR 208. In addition, one shot 230 is in electrical communication with OR gate 220. One shot 230 may allow the on command toggling of OR gate 220 without regard to the states of brake controller channel A 222 and brake controller channel B 224. In other words, one shot 230 may be used to toggle OR gate 220 even while at least one of brake controller channel A 222 and brake controller channel B 224 are sending a signal indicative of normal function to OR Gate 220. One shot 230 may comprise, for example, a monostable multivibrator.

Hall Effect sensor switch 206 may receive input from pedal 202. Hall Effect sensor switch 206 may be toggled in response to pedal 202 deflecting to an amount above a predetermined threshold, for example 0 percent deflection or 10 percent deflection. Hall Effect sensor switch 206 may be in electrical communication with OR gate 216 to control SOV 212. Standard input 232 is also in communication with OR gate 216. Standard input 232 represents the standard controlling functionality of the aircraft brake system as, for example, implemented by brake controllers such as brake controller channel A 222 and brake controller channel B 224. Thus, OR gate 216 will toggle in response to either Hall Effect sensor switch 206 or the standard input 232.

SOV 212 may comprise a shutoff valve that comprises one or more solenoid valves. SOV 212 may receive hydraulic pressure from a hydraulic fluid reservoir or other source of pressurized hydraulic fluid. SOV 212 opening may pass the pressurized hydraulic fluid to BSV 210, to which SOV 212 is in fluid communication.

BSV 210 may be in fluid communication with one or more actuators. BSV 210 may open to provide pressurized hydraulic fluid to the one or more actuators, thus enabling braking. BSV 210 may receive a voltage input from SCR 208 which varies in accordance with potentiometer 204. In such a manner, BSV 210 may open and close responsive to the voltage output of potentiometer 204, which in turn is in accordance with pedal 202.

Figure 3:
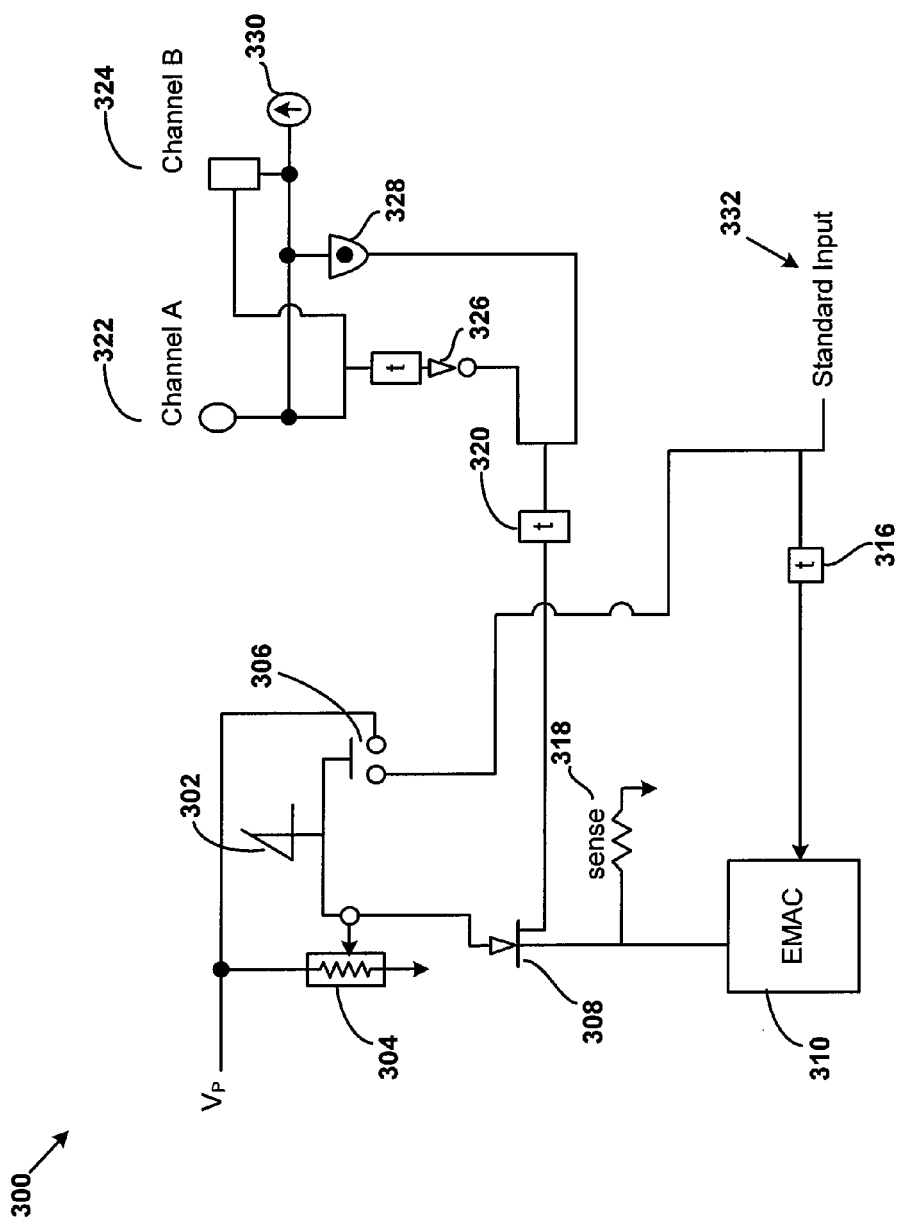
FIG. 3 illustrates a further emergency braking system for use with electric brakes in accordance with various embodiments.

An exemplary emergency braking system 300 is shown in FIG. 3. Emergency braking system 300 illustrates an embodiment comprising electric brakes. As discussed above, electric brakes do not have an SOV or BSV because hydraulic fluid is not used to engage the actuators. Instead, electric brakes have EMACs to drive electric brake actuators. As described below, an emergency brake system in the electric brake context may communicate with the EMAC at a low level in the event the brake controller malfunctions. Thus, the emergency braking capability is provided.

Voltage $V_p$ is in electrical communication with pedal 302. Pedal 302 is coupled to potentiometer 304 so that potentiometer 304 produces an output voltage in accordance with deflection of pedal 302. SCR 308 is in electrical communication with potentiometer 304. SCR 308 is controlled by OR gate 320. OR gate 320 is in electrical communication with brake controller channel A 322 and brake controller channel B 324. Brake controller channel A 322 and brake controller channel B 324 may house and implement braking logic. Brake controller channel A 322 and brake controller channel B 324 may output a status signal indicating the functioning of each respective brake controller channel. The OR gate may remain closed, and thus SCR 308 would remain open, while at least one of brake controller channel A 322 and brake controller channel B 324 are outputting a signal indicative of a functional status. Thus, both brake controller channel A 322 and brake controller channel B 324 for OR gate 320 to toggle, thus toggling SCR 308. In addition, one shot 330 is in electrical communication with OR gate 320. One shot 330 may allow the on command toggling of OR gate 320 without regard to the states of brake controller channel A 322 and brake controller channel B 324. In other words, one shot 330 may be used to toggle OR gate 320 even while at least one of brake controller channel A 322 and brake controller channel B 324 are sending a signal indicative of normal function to OR Gate 320. One shot 330 may comprise, for example, a monostable multivibrator.

Hall Effect sensor switch 306 may receive input from pedal 302. Hall Effect sensor switch 306 may be toggled in response to pedal 302 deflecting to an amount above a predetermined threshold, for example 0 percent deflection or 10 percent deflection. Hall Effect sensor switch 306 may be in electrical communication with OR gate 316 to control DOB 312. Standard input 332 is also in communication with OR gate 316. Standard input 332 represents the standard controlling functionality of the aircraft brake system as, for example, implemented by brake controllers such as brake controller channel A 322 and brake controller channel B 224. Thus, OR gate 316 will toggle in response to either Hall Effect sensor switch 306 or the standard input 332.

EMAC 310 may comprise any suitable EMAC for driving an electric brake actuator. EMAC may drive an electric brake actuator in response to a command signal. EMAC 310 may receive a voltage input from SCR 308 which varies in accordance with potentiometer 304. In such a manner, EMAC 310 may drive the electric brake actuator in response to the voltage output of potentiometer 304, which in turn is in accordance with pedal 302.

In various embodiments, a brake pedal may be communicatively coupled to another brake pedal. For example, a pilot brake pedal may be coupled to a copilot brake pedal. In such embodiments, both pedal deflection amounts may be used to determine emergency braking. For example, logic may be implemented to take the greater amount of pedal deflection detected in the two pedals and use that amount to drive braking. For example, if the pilot is incapacitated and cannot deflect a brake pedal, the copilot may deflect his brake pedal. The emergency braking system may comprise a comparator, for example, that would then select the copilot brake pedal deflection to control braking because the copilot pedal is providing greater deflection. In addition, a diode may be added for determining the maximum voltage output of the potentiometer.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising
   a potentiometer in mechanical communication with a brake pedal;
   a first electronic switch in electrical communication with the potentiometer;
   a second electronic switch configured to toggle in response to a displacement of the brake pedal;
   a first OR gate in electrical communication with the second electronic switch; and
   the first OR gate in electrical communication with a standard input,
   wherein the first OR gate is in electrical communication with a shutoff valve
   wherein a brake control valve opens in response to the first electronic switch, wherein the shutoff valve opens in response to the first OR gate and the standard input, wherein the shutoff valve controls the output of a hydraulic fluid to the brake control valve.

2. The system of claim 1, wherein the first electronic switch is a silicon controlled rectifier ("SCR").

3. The system of claim 1, wherein the second electronic switch is at least one of an SCR and a Hall Effect-driven switch.

4. The system of claim 2, wherein the first electronic switch is controlled by a second OR gate.

5. The system of claim 4, wherein the second OR gate is controlled by the functioning of at least one of a first channel, a second channel, and a one shot.

6. The system of claim 5, wherein the second OR gate remains open in response to at least one of the first channel and the second channel being operational.

7. The system of claim 5, wherein the second OR gate closes in response to firing of the one shot.

8. The system of claim 1, further comprising a current sense to detect current in the electrical path between the first electronic switch and the brake control valve.

9. The system of claim 1, further comprising a diode for determining the maximum voltage output of the potentiometer.

10. The system of claim 1, further comprising a second OR gate controlling the first electronic switch, the second OR gate in electrical communication with a second brake pedal.

11. A method comprising:
receiving, at a potentiometer, a voltage in accordance with displacement of a brake pedal;
opening a first electronic switch in response to an OR gate;
toggling a second electronic switch in response to displacement of the brake pedal;
receiving, at a brake control valve, a control signal through the first electronic switch; and
receiving, at a shutoff valve, a control signal through a second OR gate, the second OR gate being in electrical communication with the second electronic switch,
wherein the shutoff valve controls the output of a hydraulic fluid to the brake control valve.

12. The method of claim 11, further comprising exerting hydraulic pressure through the brake control valve to a brake actuator.

13. The method of claim 11, further comprising:
closing the second electronic switch.

14. The method of claim 11, further comprising sensing current through the first electronic switch.

15. A system comprising
a potentiometer in electrical communication with a brake pedal;
a first electronic switch in electrical communication with the potentiometer;
a second electronic switch configured to toggle in response to a displacement of the brake pedal;
a first OR gate in electrical communication with the second electronic switch; and
the first OR gate in electrical communication with a standard input,
wherein an electronic brake control actuator receives a braking command in response to the first electronic switch, and
wherein the electronic brake control actuator commands braking in response to the OR gate.

16. The system of claim 15, wherein the first electronic switch is an SCR.

17. The system of claim 15, wherein the second electronic switch is at least one of an SCR and a Hall Effect-driven switch.

18. The system of claim 15, wherein the braking command is a low level braking command.

19. The system of claim 15, further comprising a current sense to detect current in the electrical path between the first electronic switch and the electronic brake control actuator.

20. The system of claim 15, wherein a second OR gate is controlled by the functioning of at least one of a first channel, a second channel, and a one shot.

* * * * *